United States Patent [19]
Mizer

[11] Patent Number: 4,699,049
[45] Date of Patent: Oct. 13, 1987

[54] SEED PROCESSOR

[75] Inventor: Michael A. Mizer, Plano, Tex.

[73] Assignee: Murray-Carver, Inc., Dallas, Tex.

[21] Appl. No.: 766,791

[22] Filed: Aug. 19, 1985

[51] Int. Cl.[4] .............................................. A23N 5/00
[52] U.S. Cl. .......................................... 99/568; 19/35; 19/200
[58] Field of Search ................ 99/568, 569, 570, 575; 19/35, 39, 48 R, 64.5, 200, 205

[56] References Cited

U.S. PATENT DOCUMENTS

| | | | |
|---|---|---|---|
| 884,671 | 4/1908 | Lamb | 19/35 |
| 2,681,476 | 6/1954 | Van Doorn | 19/39 X |
| 2,762,410 | 9/1956 | Stahl | 99/568 X |
| 3,951,056 | 4/1976 | McGehee | 99/569 |

FOREIGN PATENT DOCUMENTS

| | | | |
|---|---|---|---|
| 0680242 | 10/1952 | United Kingdom | 99/570 |
| 0595431 | 2/1978 | U.S.S.R. | 99/568 |

Primary Examiner—Louis K. Rimrodt
Attorney, Agent, or Firm—Kenneth R. Glaser

[57] ABSTRACT

Cottonseed processing system includes a huller/separator combination. The huller assembly has a pair of counter-rotating, toothed rollers for shearing the seed hulls, with the shearing surfaces provided by removable segmented plates. The separator assembly is provided by a vertically disposed, angularly stepped, air duct with upwardly directed air flow separating the seed hulls from the seed meat products. A paddle wheel feeder assembly functions as an air lock between the huller assembly housing and the air duct.

4 Claims, 3 Drawing Figures

SEED PROCESSOR

This invention generally relates to seed processing, more particularly to cottonseed processing, and even more particularly to an improved method and appartaus for hulling cottonseeds and separating the seed hulls from the seed meat products.

The processing of cottonseed into usable by-products has been carried out in one manner or another for decades. In accordance with the general approach of the prior art, the seeds are initially subjected to a hulling and separating procedure to remove the seed products or oil-bearing meat kernels from the hulls, the seed products and hulls then being separately processed. The resulting by-products, i.e. cottonseed oil, meats, and hulls are then used in a variety of applications.

The removal of the seed products from the cottonseed hulls is generally a two step process, the initial step utilizing a huller to crack the cottonseed hull, followed by a process of separating the seed product from the cracked hull. While various techniques and equipment have been utilized to effect these hulling and separting operations, they all suffer from one or more disadvantages, some of which are summarized below.

For example, an effective huller/separator system should be one that minimzes, if not entirely eliminates any unhulled seeds, as well as being effective to completely separate the meat products from the cracked hulls. In addition, the hulling and separating should be carried out in a manner which substantially eliminates any absorbed oil or meat kernels from the hulls, while avoiding imparting hull particles to the meats. Furthermore, the hulling and separating process and equipment should not only be carried out and operated at a minimum cost, but should require a minimum of recycling of the seeds and their by-products.

Prior art huller/separator equipment has not only been ineffective in minimizing costs and power consumption, but has generally resulted in ineffective and incomplete separation of the hulls from the seed products. Furthermore, systems that have utilized mechanical separators have entailed undesirable crushing and mashing of the seeds, resulting in excessive absorbed oil and meats being left with the hulls, as well as undesirably imparting of hull particles to the meat kernels.

It is therefore a principal object of the present invention to provide a new and improved method and apparatus for cottonseed processing.

It is a further object of the present invention to provide new and improved apparatus for removing the seed products from cottonseed hulls.

It is a still further object of the present invention to provide new and improved hulling/separator apparatus which more effectively prevents absorbed oils and meats remaining with the hulls and avoids imparting particles of hulls to the meat products.

An additional object of the present invention is to provide the aforementioned objectives with a minimum of labor and capital cost and power consumption.

In accordance with these and other objects, the present invention is directed to a huller assembly for decorticating the cottonseed, in unique cooperative relationship with an air separator assembly for separating the decorticated seed hulls from the seed products. In accordance with a preferred embodiment of the invention, the huller assembly comprises a pair of counter-rotating, toothed rollers for shearing the seed hulls; and the air separator assembly comprises a vertically disposed air duct with means causing air flow through the duct in an upwardly direction, thereby enabling seed hulls to be expelled at the top of the air duct with the meat products dropping by gravity through the bottom of the duct. In accordance with other features of the invention, the shearing surfaces of the counter-rotating rollers are provided by removable segmented plates; and the conveyor chute for transporting the sheared hulls from the huller assembly to the air separator has associated therewith means effectively sealing the huller assembly chamber from the separator air duct.

Specific and additional features of the invention, as well as additional objects and advantages thereof, will become more readily understood and appreciated from the following detailed description of a preferred embodiment of the invention, taken in conjunction with the accompanying drawings, wherein.

The drawings are not necessarily to scale; and in some instances, portions have been exaggerated in order to highlight specific features of the invention.

Figure 1:
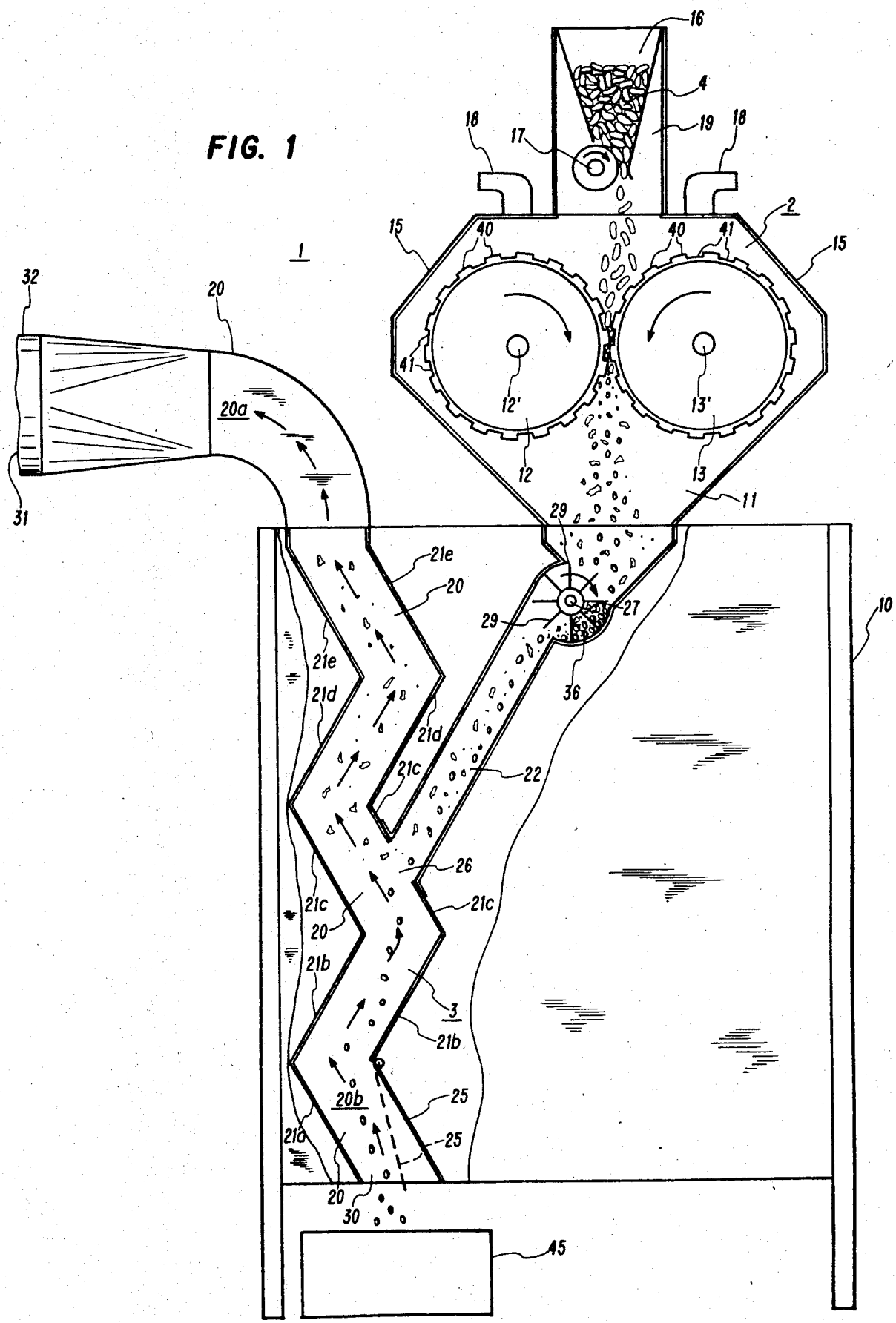
FIG. 1 is a front diagrammatic view of the huller/separator apparatus of the present invention.

Referring now to FIG. 1, the seed huller and separator apparatus is broadly depicted by the reference numeral 1 and includes a frame 10 for supporting a huller assembly 2 and an air separator assembly 3. The huller assembly 2 essentially comprises a pair of rollers 12 and 13 journaled for rotation (by way of rigidly coupled shafts 12' and 13') within a compartment 11 of the huller assembly housing enclosure 15. Disposed around the outer circumference of each of the rollers are segmented plates, the details of which are subsequently described, defining a plurality of teeth 40 and adjacent grooves 41.

The rollers 12 and 13 are powered for counter rotation (in the direction of the arrows); and the roller shafts 12' and 13' are laterally spaced a sufficient distance to enable the seeds to pass between the rollers and be longitudinally positioned within the grooves 41. By powering the rollers 12 and 13 at differential speeds, the so-positioned seeds are sheared by the scissoring action of the teeth 40 of the cooperating rollers, cracking the seed hulls to enable their separation from the meat products.

Mounted above the huller assembly enclosure 15 is a feed assembly 19 including a supply hopper 16 for receiving the unhulled cottonseeds 4 and a feed roller 17 for dispensing these seeds into the compartment 11 and to the huller assembly 2. The feed assembly does not, in of itself, constitute part of the invention and may be of any type conventionally known in the art, it only being important that the assembly be so positioned to dispense the unhulled seeds between the rollers 12 and 13, as shown in FIG. 1. Air manifolds 18 are preferably disposed at the top of the enclosure 15, and in communication with chamber 11, for the purpose of venting chamber 11 to purge any dust laden air therefrom.

Disposed in operative relationship with the huller assembly is an air separator assembly 3 comprising a main vertically disposed air duct 20 defined by angularly stepped wall portion 21a–21e, the duct 20 communicating with chamber 11 by way of chute 22. The duct 20 is open at both the top 20a and bottom 20b, a port 30 being provided at its lower end and a port 31 being provided at its upper end.

Figure 3:
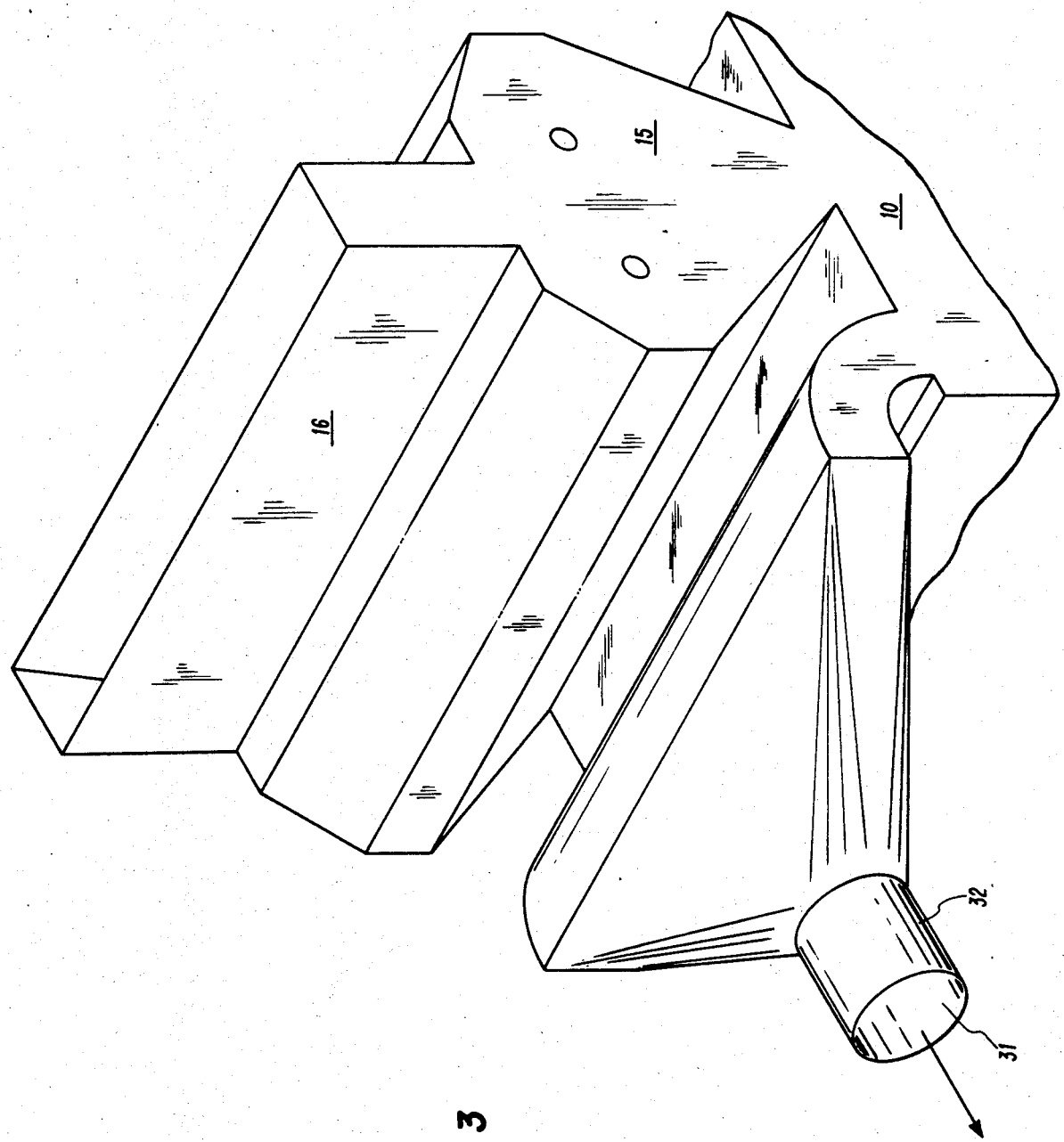

Suction means (not shown) such as a vacuum pump or the like disposed at the top 20a of the duct causes air flow through the duct in the upward direction (as shown by the arrows); and, if desired, a damper 25 of conventional construction is provided at the bottom 20b of the duct for adjusting the air velocity. In accordance with a special feature of the air separator assembly, and for the purpose subsequently to be described, the outlet port 31 is defined by a circular wall portion 32 having a lesser area than the area of the main wall portions 21a–21e of the duct 20, as best seen in FIG. 3.

The chute 22 communicates at its lower end with the air duct 20 by way of port 26a, and at its upper end with the huller assembly chamber 11 by way of port 36. In accordance with a feature of the present invention, a paddle wheel feeder assembly 27 is journaled for rotation within the port 36 and includes paddles 29 of a configuration and number sufficient to provide an air seal at port 36. Thus, the paddle wheel feeder assembly 27 not only functions to dispense the hulled seeds from the huller assembly, through the chute 22, and to the air duct 20 of the air separator assembly, but also functions as an air lock between the air duct 20 and the huller assembly chamber 11.

In accordance with the operation of the huller/separator of the present invention, unhulled seeds from the hopper 16 are dispensed by the feed roller 17 to the interior of the huller compartment 11 where they pass between the counter rotating rollers 12 and 13, as best depicted in FIG. 1. As a consequence of the orientation of these seeds in the longitudinal direction within the grooves 41 and the interaction of the cutting teeth 40 of the cooperating rollers, the cottonseed hulls are effectively sheared to enable their separation from the seed meat products therein.

The so-hulled cottonseed then drops on to the paddle wheel feeder assembly 27, resulting in the dispensing and conveying of the hulled seeds through the chute 22 to the interior of the air duct 20 of the air separator assembly 3.

The air separator assembly is effective to loosen and dislodge the seed meats from the cracked hulls, with the hulls being conveyed upwardly through the air ducts 20 to exit the upper port 31, while the seed meat products drop through the lower port 30 into a suitable container 45.

Specifically, the upwardly directed air flow through the duct 20, made turbulent as a consequence of the angularly stepped wall portions, agitates the hulled seeds dispensed to the duct, loosening the hulls from the seed meats. As a consequence of this action, as well as the impingement of the seeds against the interior wall portions, the hulls and seed meats are effectively separated within the duct. Then, because the hulls are of much lighter weight than the seed meats, the air flow will carry the hulls to the top of the duct, while the heavier seed meats drop by gravity through the port 30. The damper 25 can be adjusted to regulate the air velocity through the duct to optimize this separation. Furthermore, and as a specific feature of the duct construction, the smaller area port 31 will result in increased air velocity at the drop of the duct, thus accelerating the evacuation of the lighter hulls.

As a consequence of this arrangement, drastic improvements in the hulling/separating process are achieved. For example, since the separation of the hulls from the seed meats is being carried out as a consequence of the turbulent air flow within the duct, rather than by a mechanical separator, the overall process more effectively prevents absorbed oils and meats remaining with the hulls, as well as avoiding imparting particles of the hulls to the meat products. The hulling and separating process is also carried out with a minimum of labor and capital costs and power consumption.

It is particularly pointed out that while, in a preferred embodiment, the air separator assembly of the present invention is to be used in synergistic combination with the rotating roller decorticator described herein, the air separator assembly affords numerous advantages when used in combination with any type of huller.

Figure 2:
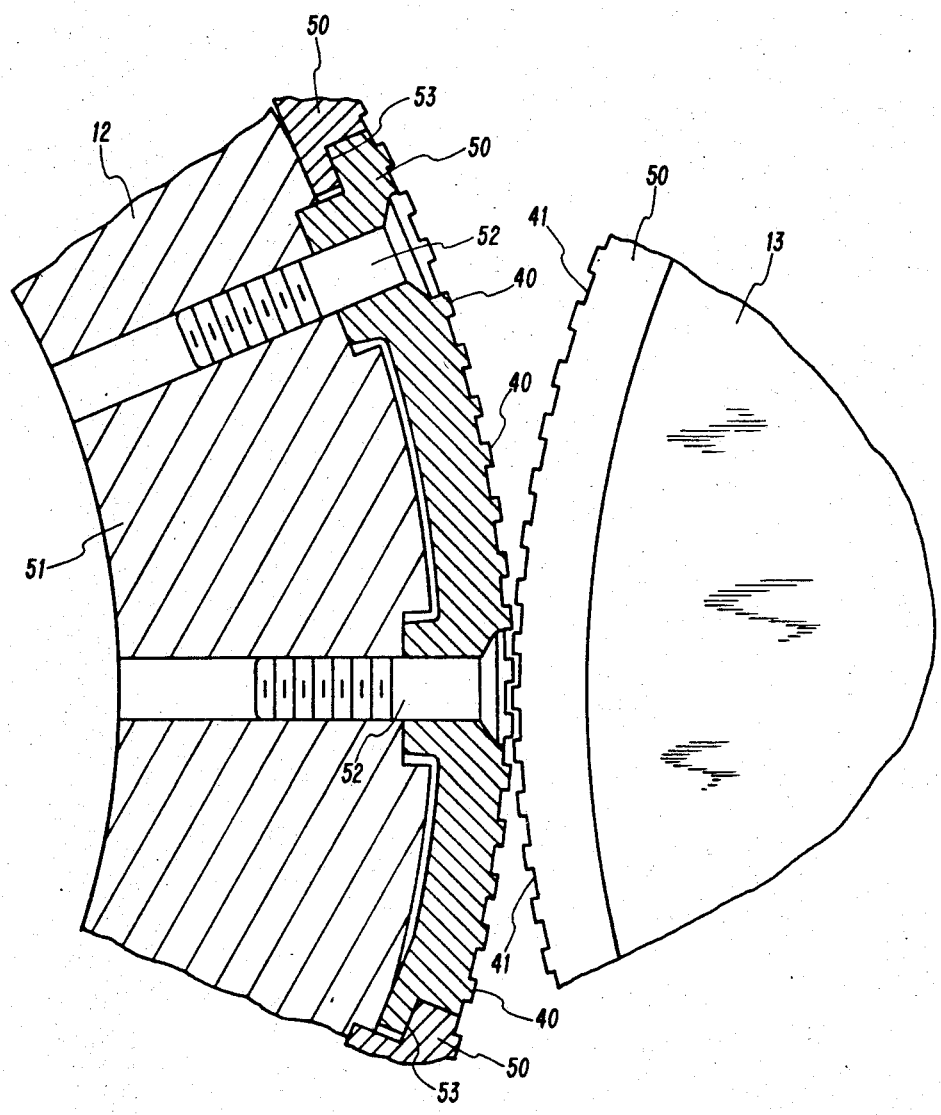
FIG. 2 is a view, partially in section, illustrating the removable, segmented nature of the huller plates of the huller assembly rollers depicted in FIG. 1; and, FIG. 3 is a perspective view of the top portion of the apparatus depicted in FIG. 1, particularly illustrating the top exit port of the air separator duct.

In accordance with another specific feature of the present invention, and as best depicted in FIG. 2, the circumferential shearing surface of each of the counter-rotating rollers 12 and 13 is provided by segmented plates 50 removably attached to the body 51 of the roller by machine screws 52, for example. Each of these segments 50 has the teeth 40 and grooves 41 formed therein and is adapted to interfit with another like segment along intersecting portions 53. This feature then enables the replacement of individual sections of the cutting or shearing surfaces, when worn, without requiring replacement of the entire rollers.

Various modifications to the described embodiment, as well as alternate embodiments, of the invention may become apparent to those skilled in the art without departing from the spirit and scope of the invention, as defined by the appended claims.

I claim:

1. Cottonseed huller and separator apparatus comprising, in combination:
   (a) a huller assembly disposed in a huller assembly housing for shearing seed hulls of cottonseeds supplied thereto, said huller assembly comprising a pair of rollers powered for counter rotation at respectively differential speeds, the outer circumference of each roller defining a plurality of adjacent teeth and grooves, the rollers being laterally spaced to enable cottonseeds to pass between said rollers and be positioned within said grooves, thereby enabling the shearing of the hulls of said cottonseeds by scissoring action of the teeth of the cooperating roller;
   (b) a feed assembly so positioned to dispense unhulled cottonseeds between said pair of rollers of said huller assembly;
   (c) an air separator assembly for effectively separating the sheared seed hulls of said cottonseeds from the seed meat products thereof, said air separator assembly comprising a vertically disposed air duct open at the top and bottom thereof with means causing air flow through said duct in an upwardly direction, said air duct having a plurality of adjacent wall portions alternately angularly stepped in opposite directions to provide air flow turbulence in said duct and to enable impingement of the sheared cottonseeds against said wall portions, the opening of the air duct at the top thereof having a smaller cross-sectional area than the cross-sectional area of the main portion of the duct, whereby cottonseed hulls are expelled by said air flow out the top of said air duct and seed meat products drop by force of gravity through the bottom of said air duct, the smaller cross-sectional area of the air duct opening at the top thereof accelerating the evacuation of the hulls; and (d) chute means, having a top opening below said huller assembly, for conveying sheared seeds and seed meat products from said huller assembly to said duct, a chute feeder assembly disposed in the top opening of said chute means, said chute feeder assembly also serving as an air lock between said chute and said huller assembly housing.

2. The apparatus as defined by claim 1 wherein said chute feeder assembly comprises a paddle wheel feeder assembly disposed within the top opening of said chute means.

3. The apparatus as defined by claim 1, further comprising means for regulating the air flow velocity through said duct.

4. The apparatus as defined by claim 1, wherein the shearing surfaces of each of said rollers of said huller assembly are provided by removable, segmented plates.

* * * * *